United States Patent [19]

Katagiri et al.

[11] Patent Number: 4,617,594
[45] Date of Patent: Oct. 14, 1986

[54] SIGNAL GENERATOR CIRCUIT

[75] Inventors: Koichi Katagiri, Tokyo; Yoshihiro Hanamoto, Hyogo; Satoru Maeda, Kanagawa; Ikuo Taniguchi, Tokyo, all of Japan

[73] Assignees: Nippon Telegraph and Telephone Corp.; Sony Corporation, both of Tokyo, Japan

[21] Appl. No.: 722,355

[22] Filed: Apr. 12, 1985

[30] Foreign Application Priority Data

Apr. 13, 1984 [JP] Japan .................. 59-74365

[51] Int. Cl.$^4$ ............................. H04N 5/06
[52] U.S. Cl. ........................ 358/150; 331/20
[58] Field of Search .............. 358/148, 150, 151, 17; 331/20

[56] References Cited

U.S. PATENT DOCUMENTS 4,517,587 5/1985 Alzawa et al. ................ 358/150
4,520,394 5/1985 Kaneko ........................ 358/150

FOREIGN PATENT DOCUMENTS 2039695 8/1980 United Kingdom ............ 358/150

Primary Examiner—Jin F. Ng
Attorney, Agent, or Firm—Lewis H. Eslinger; Alvin Sinderbrand

[57] ABSTRACT

A signal generator circuit for a television receiver employed in a videotex or CAPTAIN system comprises a reference signal oscillator for producing a reference signal and a synchronizing signal generator for generating a horizontal synchronization signal synchronized with the reference signal. A frequency divider is responsive to the reference signal for producing a color sub-carrier signal. A phase-locked loop is responsive to the sub-carrier signal and includes a voltage-controlled oscillator. The voltage-controlled oscillator produces an output signal synchronized with the sub-carrier signal and having a series of rising edges. A rising edge of the sub-carrier signal periodically coincides with a rising edge of the signal from the voltage-controlled oscillator. A detector detects a time when a rising edge of the sub-carrier signal coincides with a rising edge of the output signal of the voltage-controlled oscillator, and a clock signal is then generated synchronized with the output signal of the voltage-controlled oscillator and having a series of falling edges. The horizontal synchronization signal generator and the clock signal generator are controlled so as to ensure that the rising edge of the horizontal synchronization signal coincides with a falling edge of the clock signal. This ensures an accurate count of the pulses for determining the horizontal position of a display by the receiver and prevents horizontal jitter in the display.

7 Claims, 12 Drawing Figures

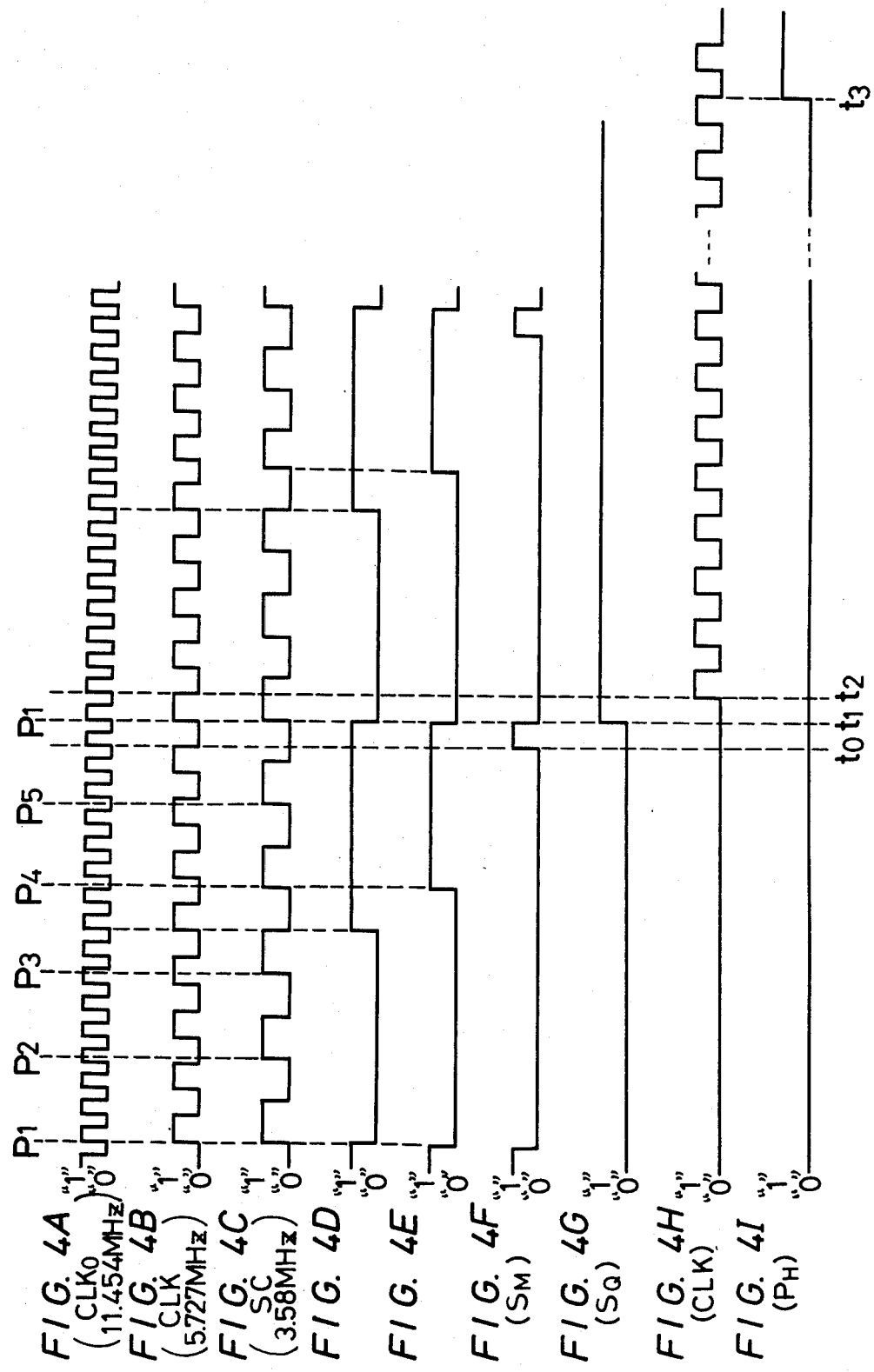

SIGNAL GENERATOR CIRCUIT

BACKGROUND OF THE INVENTION

1. Field of the Invention

This invention relates to signal generator circuits and, more particularly, to a novel and highly-effective signal generator circuit for generating a synchronization signal, a display clock signal and similar signals for a television receiver employed in a character and picture image information system such as a videotex or CAPTAIN (character and pattern telephone access information network) system and which uses, for example, a telephone network line for signal transmission.

2. Description of the Prior Art

In the videotex and CAPTAIN character and picture image information systems and similar systems using a color television receiver as a display apparatus, there are required signals such as vertical and horizontal synchronization signals, a color sub-carrier signal (for example, a signal having a frequency of substantially 3.58 MHz) and a display clock signal (for example, a signal having a frequency of substantially 5.727 MHz). When character and picture information is displayed on the screen of a television receiver, the display portion in the horizontal direction is determined with reference to the horizontal synchronization signal: i.e., such information is displayed at a predetermined position (time) with respect to the position (time) of the horizontal synchronization signal. To indicate such display position, a special pulse is generated. The position of the special pulse is determined by the operation of a counter which begins at a time which, because of deficiencies in the prior-art structures, may change by one clock period in successive horizontal lines. This of course correspondingly displaces the display position pulse so that a jitter appears in a reproduced picture in the horizontal direction on the screen of the television receiver.

OBJECTS AND SUMMARY OF THE INVENTION

An object of the invention is to provide a signal generator circuit for generating a synchronization signal for a television receiver for use with a videotex or CAPTAIN character and picture information system and similar systems.

Another object of the invention is to provide such a signal generator circuit in which a display position pulse is formed at a constant position with respect to the horizontal synchronization signal so that jitter in the horizontal direction of a picture displayed on a screen is avoided.

Another object of the invention is to provide a signal generator circuit which can produce a display clock signal and a horizontal synchronization signal having a constant phase relation therebetween such for example that the rising edge of the display clock signal and the rising edge of the horizontal synchronization avoid coincidence with each other.

According to one aspect of the present invention, there is provided a signal generator circuit comprising: reference signal oscillator means for producing a reference signal having a series of rising edges; means responsive to the reference signal for generating a horizontal synchronization signal synchronized with the reference signal; frequency-dividing means responsive to the reference signal for producing a color sub-carrier signal having a series of rising edges; a phase-locked loop circuit responsive to the sub-carrier signal and including a voltage-controlled oscillator, the voltage-controlled oscillator producing an output signal having a series of rising edges, at least one rising edge of the sub-carrier signal coinciding with a rising edge of the signal from the voltage-controlled oscillator, the output signal from the voltage-controlled oscillator being synchronized with the sub-carrier signal; means for detecting a time at which a rising edge of the sub-carrier signal coincides with a rising edge of the output signal of the voltage-controlled oscillator; means for generating a clock signal synchronized with the output signal of the voltage-controlled oscillator and having a series of falling edges; means for generating power supply voltage, the power supply voltage having a rising edge upon application to the signal generator circuit; and means for detecting the rising edge of the power supply voltage; the horizontal synchronization signal generating means and the clock signal generating means being controlled by the time detecting means and the rising edge detecting means so as to ensure that the rising edge of the horizontal synchronization signal avoids coincidence with a rising edge of the clock signal.

BRIEF DESCRIPTION OF THE DRAWINGS

A better understanding of the objects, features and advantages of the invention can be gained from a consideration of the following detailed description of the preferred embodiment thereof, taken in conjunction with the accompanying figures of the drawings, wherein like reference characters designate like elements and parts, and wherein FIG. 1 is a block diagram of a typical prior-art signal generator circuit for generating a color sub-carrier signal and a display clock signal for use in a television receiver forming part of a videotex or CAPTAIN system or the like;

FIGS. 4A to 4I are respectively waveform diagrams useful for explaining the operation of the embodiment of FIG. 3.

DESCRIPTION OF THE PREFERRED EMBODIMENT

Figure 1:
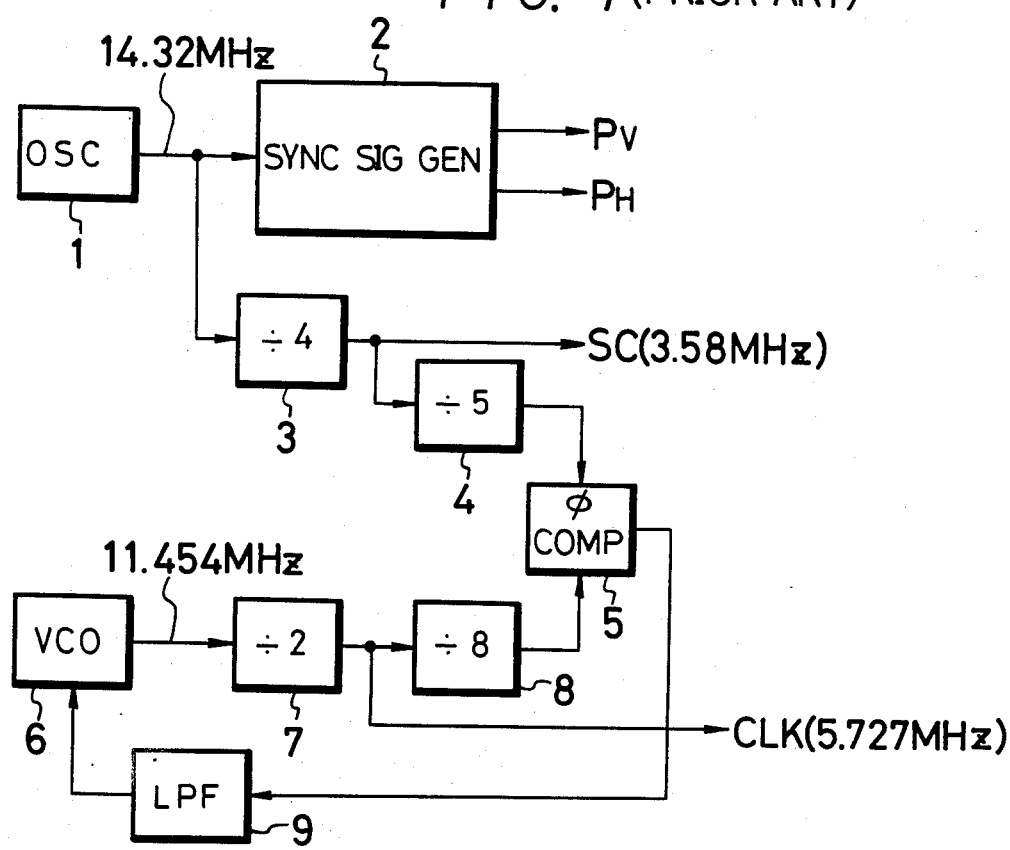

FIG. 1 discloses a typical prior-art signal generator circuit for generating a color sub-carrier signal and a display clock signal for use in a television receiver forming part of a videotex or CAPTAIN system or the like. In FIG. 1, an oscillator circuit 1 generates an oscillation signal with a frequency of substantially 14.32 MHz, which is four times the desired color sub-carrier frequency of substantially 3.58 MHz. The oscillation signal is supplied to a television synchronization signal generator circuit 2, which produces a vertical synchronization signal $P_V$ and a horizontal synchronization signal $P_H$.

The oscillation signal of 14.32 MHz from the oscillator circuit 1 is supplied also to a frequency divider 3, which divides the input frequency of 14.32 MHz by four to produce the color sub-carrier signal SC of 3.58 MHz. The color sub-carrier signal SC is utilized in a known manner by circuitry not shown Since the horizontal synchronization signal $P_H$ and the color sub-carrier signal SC are produced in response to the same oscillation signal from the oscillator circuit 1, they are synchronized with each other in phase.

The color sub-carrier signal SC of 3.58 MHz from the frequency divider 3 is supplied also to a frequency divider 4, which divides the input frequency of 3.58 MHz by five and supplies a signal having a frequency of substantially 716 KHz to a phase comparator 5.

A voltage-controlled oscillator 6 generates a signal having a frequency of substantially 11.454 MHz. This signal is supplied to a frequency divider 7 that divides by two. The output of the divider 7 is supplied to a frequency divider 8 that divides by eight. The output of the frequency divider 8 is supplied to the phase comparator 5 in which it is compared in phase with the signal of substantially 716 KHz which results from frequency-dividing the color sub-carrier signal SC of 3.58 MHz by five. The error signal from the phase comparator 5 is supplied though a low-pass filter 9 to the voltage-controlled oscillator 6 as the control voltage thereof. Accordingly, the voltage-controlled oscillator 6 produces an oscillation signal of substantially 11.454 MHz and the frequency divider 7 produces a signal of substantially 5.727 MHz which is supplied to circuitry (not shown) as a display clock signal CLK. The display clock signal CLK is of course synchronized in phase with the color sub-carrier signal SC.

The frequency of the display clock signal CLK (5.727 MHz) is thus 8/5 times the frequency of the color sub-carrier signal SC (3.58 MHz). Phase synchronization is established between the signal obtained by frequency-dividing the color sub-carrier signal SC by five (by means of the divider 4) and that obtained by frequency-dividing the display clock signal CLK by eight (by means of the divider 8). As a result, the phase difference between the display clock signal CLK (shown in line A of FIG. 2) and the color sub-carrier signal SC (shown in line B of FIG. 2) assumes five different values at times $P_1$ to $P_5$. Specifically, each of the times $P_1$ to $P_5$ coincides with a rising edge of the color sub-carrier signal SC, but only the time $P_1$ coincides with a rising edge of the display clock signal CLK; the remaining times $P_2$ to $P_5$ fall varying distances between rising and falling edges of the display clock signal CLK. Since, as indicated above, the horizontal synchronization signal $P_H$ is phase-synchronized with the color sub-carrier signal SC, the phase difference between the respective rising edges of the horizontal synchronization signal $P_H$ and the display clock signal CLK also assumes any of five different values at times $P_1$ to $P_5$, as shown in line A in conjunction with lines C through G of FIG. 2.

In the apparatus of the prior art, the one of the times $P_1$ to $P_5$ at which the phase difference between the rising edges of the horizontal synchronization signal $P_H$ and the display clock signal CLK is measured is randomly determined in accordance with the initial state of a counter or the like included in the synchronization signal generator 2 and the lock-in time of a phase-locked loop (PLL) circuit that includes the phase comparator 5, the voltage- controlled oscillator (VCO) 6, etc.

When character and picture information is displayed on the screen of a television receiver employed in a videotex or CAPTAIN system or the like, the display position in the horizontal direction is determined with reference to the horizontal synchronization signal $P_H$: i.e., such information is displayed at a predetermined position (time) with respect to the position (time) of the horizontal synchronization signal $P_H$. To indicate such display position, a special pulse (hereinafter referred to as a display position pulse) is generated.

The display position pulse is generated by employing the rising edge of the horizontal synchronization signal $P_H$ to reset (or preset) a counter or the like (not shown) and by then counting the successive rising edges of the display clock signal CLK until a count value is reached which corresponds to the desired display position.

However, as indicated above, there is a possibility that the phase difference between the rising edges of the horizontal synchronization signal $P_H$ and the display clock signal CLK will assume any of five values respectively indicated at times $P_1$ to $P_5$. If the randomly-determined time is such that the rising edge of the horizontal synchronization signal $P_H$ and the rising edge of the display clock signal CLK are very close to each other, as at time $P_1$, then when the rising edge of the horizontal synchronization signal $P_H$ appears, it becomes difficult to determine whether the count of the display clock signal CLK pulses should begin with the instant rising edge thereof or whether it should begin with the next following rising edge thereof. As a result, in the worst case, the operation of the counter begins at a time which changes by one clock period at every horizontal line. This of course correspondingly displaces the display position pulse. Thus, a jitter appears in a reproduced picture in the horizontal direction of the screen of the television receiver. Statistically, the horizontal jitter is unlikely to affect every line but occurs periodically.

FIGS. 3 and 4A through 4I illustrate a preferred embodiment of a signal generator circuit according to the present invention which reliably prevents horizontal jitter in the display. In accordance with the invention, the display clock signal CLK (FIG. 4H) and the horizontal synchronization signal $P_H$ (FIG. 4I) always have a constant phase relation therebetween in which the rising edge of the display clock signal CLK and the rising edge of the horizontal synchronization signal $P_H$ never coincide with each other. Preferably, a falling edge of the display clock signal CLK coincides with the rising edge of the horizontal synchronization signal $P_H$, as shown in FIGS. 4H and 4I at time $t_3$.

Figure 3:
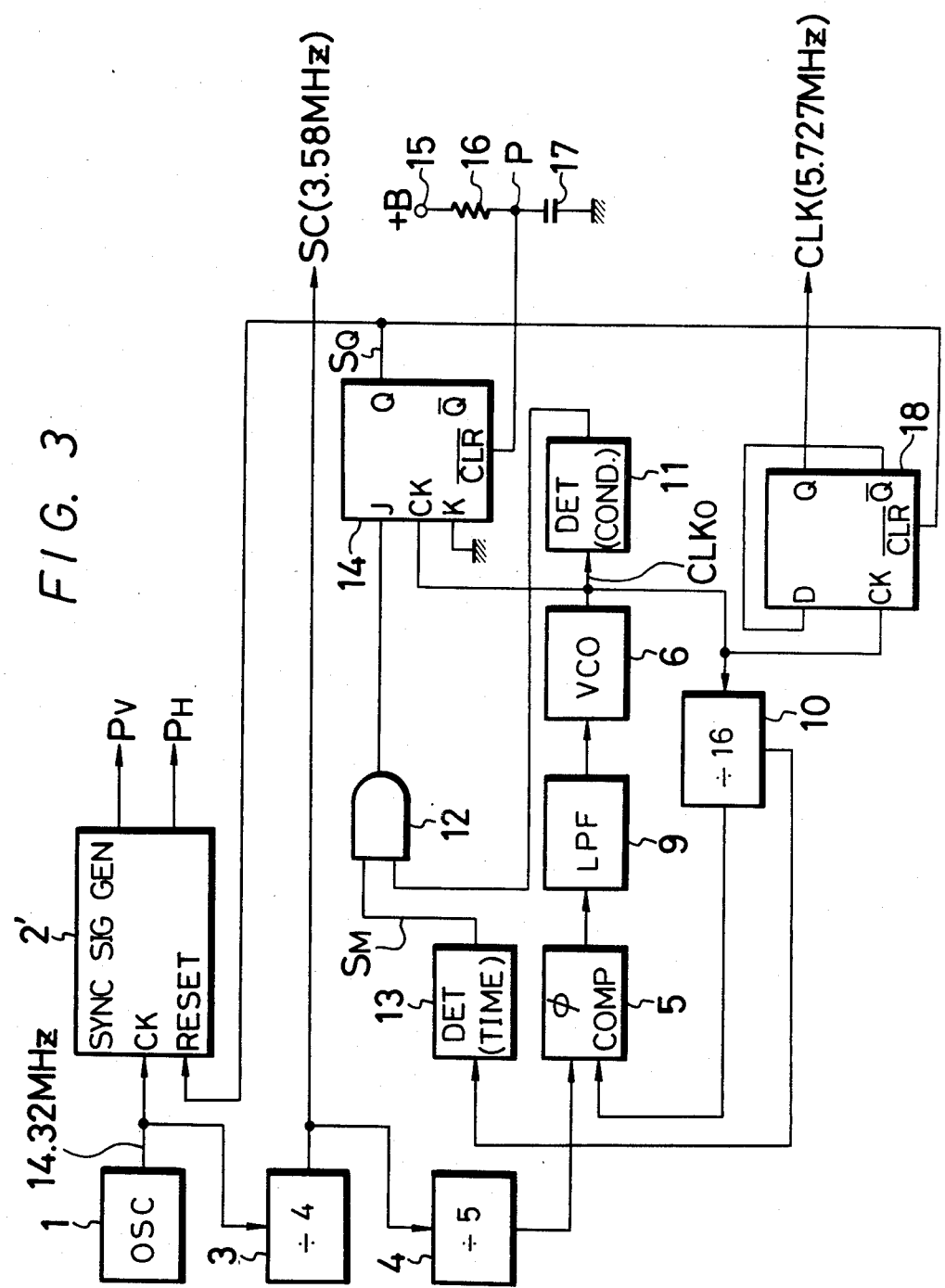
FIG. 3 is a block diagram of a preferred embodiment of a signal generator circuit constructed in accordance with the invention.

In FIG. 3, parts corresponding to those of FIG. 1 are marked with the same references and are not described in detail. A television synchronization signal generator circuit 2' has a clock input terminal CK to which an oscillation signal having a frequency of substantially 14.32 MHz is supplied from the oscillator 1. On the basis of the oscillation signal of 14.32 MHz supplied thereto, the synchronization signal generator circuit 2' produces a vertical synchronization signal $P_V$ and a horizontal synchronization signal $P_H$. The circuit 2' includes a reset terminal RESET. When a low-level signal "0" is supplied to the reset terminal RESET, the circuit 2' is held in a reset state; and, when a high-level signal "1" is supplied to the reset terminal RESET, the circuit 2' starts its operation.

The oscillation signal of 14.32 MHz from the oscillator 1 is supplied also to a frequency divider 3, which divides the 14.32 MHz signal by four and produces a color sub-carrier signal SC having a frequency of substantially 3.58 MHz. The color sub-carrier signal SC is supplied to a frequency divider 4, which divides the 3.58 MHz signal by five and produces a signal having a frequency of substantially 716 KHz. The output of the frequency divider 4 is supplied to a phase comparator 5.

The oscillation signal from a voltage-controlled oscillator (VCO) 6 which forms a part of a phase-locked loop (PLL) circuit is supplied to a frequency divider 10. The frequency divider 10 divides the frequency of the signal from the VCO 6 by 16 and supplies an output to the phase comparator 5. The frequency divider 10, like the other frequency dividers employed in the apparatus of the invention, may comprise a counter. The divider 10 may comprise, for example, an up-mode counter for counting from 0 to 15 and producing one output pulse for every 16 input pulses. The phase comparator 5 makes a phase comparison between the signal supplied by the divider 10 and the above-mentioned signal which is generated by the frequency divider 4 when it divides the frequency of the color sub-carrier signal SC of 3.58 MHz by five. The compared error signal from the phase comparator 5 is supplied through a low-pass filter (LPF) 9 to the VCO 6 as its control voltage so that the VCO 6 produces an oscillation signal $CLK_0$ (shown in FIG. 4A) of substantially 11.454 MHz.

The oscillation signal $CLK_0$ from the VCO 6 is supplied to a timer circuit 11. In the timer circuit 11 the oscillation signal $CLK_0$ supplied thereto is counted. Until the above-described PLL circuit is stabilized, the timer 11 produces a low-level signal "0" at its output; thereafter, the timer 11 produces a high-level signal "1" at its output. The output signal from the timer 11 is supplied to one input terminal of an AND gate 12.

A detecting circuit 13 is provided to detect a time $P_1$ at which the rising edge of the color sub-carrier signal SC of 3.58 MHz (shown in FIG. 4C) coincides with the rising edge of the oscillation signal $CLK_0$ of 11.454 MHz (shown in FIG. 4A). The detecting circuit 13 is supplied with signals corresponding to selected bits of a counter incorporated in the frequency divider 10 so that the detecting circuit 13 produces a signal $S_M$ which, as shown in FIG. 4F, becomes high or "1" during each period of the signal $CLK_0$ in which the count value of such counter is maximum. Alternatively, when the counter incorporated in the frequency divider 10 counts in a down-mode, the signal $S_M$ goes high during the period of the signal $CLK_0$ in which the count value of the counter is minimum. The maximum or minimum count, as the case may be, is reached during the period of the signal $CLK_0$ immediately preceding the time $P_1$. The detection signal $S_M$ is high or "1" during the interval from $t_o$ to $t_1$ and is supplied to the other input terminal of the AND gate 12.

The output signal from the AND gate 12, which is produced when and only when a signal is supplied to each input terminal of the AND gate, is supplied to a J input terminal of a J-K flip-flop 14. The K input terminal of the flip-flop 14 is grounded, and the clock input terminal CK thereof is supplied with the oscillation signal $CLK_0$.

A power source terminal 15 to which a positive DC voltage +B is applied is grounded through a series-connected resistor 16 and capacitor 17 that constitute a time-constant circuit fo detecting the rising edge of the power voltage. The signal obtained at a connection point P between the resistor 16 and the capacitor 17 is supplied to the clear terminal $\overline{CLR}$ of the flip-flop 14. The signal produced at the connection point P is low or "0" during a predetermined period $T_0$ (determined by the time constant of the resistor 16 and the capacitor 17) after power is applied to the terminal 15.

A signal $S_Q$ (shown in FIGS. 3 and 4G) obtained at the output terminal Q of the flip-flop 14 is supplied to the reset terminal RESET of the above-described synchronization signal generator 2'.

The signal $S_Q$ is supplied also to a clear terminal $\overline{CLR}$ of a D—flip-flop 18. The flip-flop 18 receives at its clock input terminal CK the oscillation signal $CLK_0$ (shown in FIGS. 3 and 4A) from the VCO 6 so that the flip-flop 18 is operated at each rising edge of the oscillation signal $CLK_0$. The signal obtained in response thereto at the inverted output terminal $\overline{Q}$ of the flip-flop 18 is supplied to its D input terminal so that the flip-flop 18 produces at its output terminal Q the display clock signal CLK (FIGS. 3 and 4H) of substantially 5.727 MHz.

Figure 2:
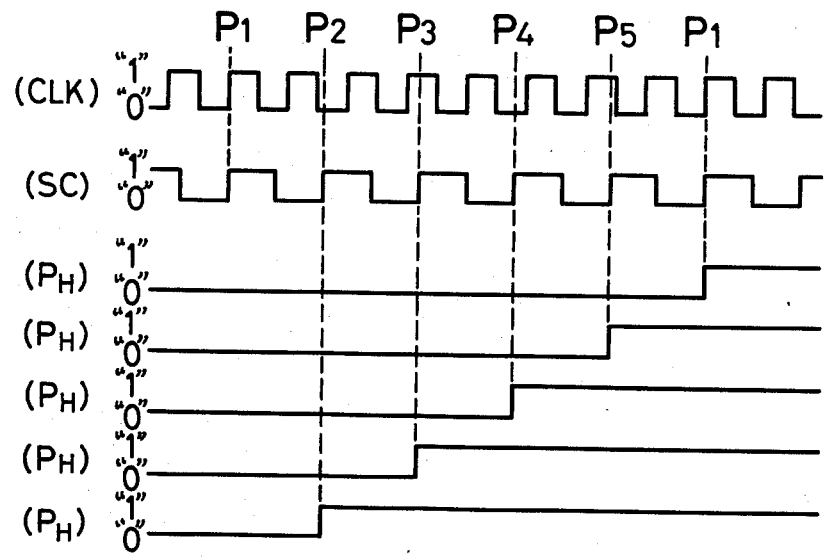
FIG. 2 is a waveform diagram useful for explaining the operation of the prior-art signal generator circuit of FIG. 1.

For comparison, the display clock signal CLK of FIG. 1 and FIG. 2, line A, is reproduced in FIG. 4B. It is evident that the display clock signal CLK in FIG. 4B is 180° out of phase with that of FIG. 4H. FIG. 4D shows the output signal from the frequency divider 10 which is supplied to the phase comparator 5, and FIG. 4E shows the output signal from the frequency divider 4, which is likewise supplied to the phase comparator 5.

The signal generator circuit of an embodiment of the invention constructed as disclosed above operates as follows:

When power is applied to the terminal 15, a signal which is low or "0" during a predetermined period $T_0$ is produced at the connection point P between the resistor 16 and the capacitor 17 and supplied to the clear terminal $\overline{CLR}$ of the flip-flop 14. Accordingly, the flip-flop 14 holds the clear mode during the period $T_0$ so that the signal $S_Q$ produced at the output terminal Q thereof is low or "0". Since the signal $S_Q$ is supplied to the reset terminal RESET of the synchronization signal generator 2', the circuit 2' is held in the reset state during the period $T_0$ and hence it does not start its operation (see the left portion of FIG. 4I). Further, since the signal $S_Q$ is supplied to the clear terminal $\overline{CLR}$ of the flip-flop 18, the flip-flop 18 holds its clear mode during the period $T_0$ (see the left portion of FIG. 4G) and hence the display clock signal CLK is not produced at the output terminal Q thereof (see the left portion of FIG. 4H).

After the PLL including the VCO 6 stabilizes, the timer circuit 11 produces an output signal which is high or "1" and which is supplied to one input terminal of the AND gate 12. During the interval from $t_o$ to $t_1$, the detecting circuit 13 produces the signal $S_M$ as shown in FIGS. 3 and 4F, and the signal $S_M$ is supplied to the other input terminal of the AND gate 12. Accordingly, during the period from $t_0$ to $t_1$ in which the detection signal SM is high or "1", the AND gate 12 produces at its output a signal which is high or "1", and this output is supplied to the J terminal of the flip-flop 14.

If the above-described predetermined period $T_0$ has elapsed, the signal $S_Q$ (shown in FIGS. 3 and 4G) produced at the output terminal Q of the flip-flop 14 is changed from low or "0" to high or "1" at time $t_1$. Since the K terminal of the flip-flop 14 is grounded, the flip-flop 14 remains in the high or "1" state after the time $t_1$.

At time $t_1$, the signal $S_Q$, which is now high or "1", is supplied to the reset terminal RESET of the synchronization signal generator 2' and to the clear terminal $\overline{CLR}$ of the flip-flop 18. At time $t_1$, therefore, the circuit 2' starts its operation and the clear mode of the flip-flop 18 is released. Moreover, since a high or "1" signal is supplied to the D terminal of the flip-flop 18 from its inverted output terminal $\overline{Q}$, the display clock signal CLK (shown in FIGS. 3 and 4H) of substantially 5.727 MHz is produced at its output terminal Q beginning at time $t_2$, which follows time $t_1$ by one period of the signal $CLK_0$.

Since time $t_2$, when the display clock signal CLK begins, follows time $t_1$, when the operation of the synchronization signal generator 2' begins, by one cycle of the signal $CLK_0$ or one-half cycle of the clock signal CLK, the rising edge of the horizontal synchronization signal $P_H$ (FIG. 4I) always coincides with the falling edge of the display clock signal CLK (FIG. 4H) at a time $t_3$. In other words, in this embodiment, the rising edge of the display clock signal CLK is never coincident with the rising edge of the horizontal synchronization signal $P_H$. Accordingly, when the counter controlling the generation of the display position pulse is reset by the horizontal synchronization signal $P_H$ generated by the circuit of FIG. 3 and the display position pulse is formed by circuitry (not shown) for counting the display clock signal CLK generated by the circuit of FIG. 3, the position at which the display position pulse is formed is always constant (i.e., it never fluctuates). As a result, horizontal jitter in the displayed picture is prevented.

Thus, there is provided in accordance with the invention a signal generation circuit which is ideally suited for a television receiver for use with a videotex or CAPTAIN character and picture information system and similar systems. A display position pulse is formed at a constant position so that jitter in the horizontal direction of a picture displayed on a screen is avoided. The signal generator circuit of the invention can produce a display clock signal and a horizontal synchronization signal having a constant phase relation therebetween such for example that the rising edge of the display clock signal and the rising edge of the horizontal synchronization signal are never coincident with each other.

Many modifications of the preferred embodiment of the invention disclosed herein will readily occur to those skilled in the art upon consideration of this disclosure. For example, the phase relation between the rising edge of the display clock signal CLK and the rising edge of the horizontal synchronization signal $P_H$ can be varied parametrically so long as they are never selected so that they coincide. Moreover, the frequencies of the various signals and correspondingly the characteristics of the oscillators and frequency dividers can be varied. Also, devices other than the disclosed detector, dividers, oscillator and flip-flops can be used for generating the signals $S_M$, $S_Q$, $CLK_0$ and CLK. Accordingly, the invention includes all structure which falls within the scope of the appended claims.

We claim as our invention:

1. A signal generator circuit comprising:
reference signal oscillator means for producing a reference signal having a series of rising edges;
means responsive to said reference signal for generating a horizontal synchronization signal synchronized with said reference signal;
frequency-dividing means responsive to said reference signal for producing a color sub-carrier signal having a series of rising edges;
a phase-locked loop circuit responsive to said sub-carrier signal and including a voltage-controlled oscillator, said voltage-controlled oscillator producing an output signal having a series of rising edges, at least one rising edge of said sub-carrier signal coinciding with a rising edge of said signal from said voltage-controlled oscillator, said output signal from said voltage-controlled oscillator being synchronized with said sub-carrier signal;
means for detecting a time at which a rising edge of said sub-carrier signal coincides with a rising edge of said output signal of said voltage-controlled oscillator;
means for generating a clock signal synchronized with said output signal of said voltage-controlled oscillator and having a series of falling edges;
means for generating power supply voltage, said power supply voltage having a rising edge upon application to said signal generator circuit; and
means for detecting said rising edge of said power supply voltage;
said horizontal synchronization signal generating means and said clock signal generating means being controlled by said time detecting means and said rising edge detecting means so as to ensure that the rising edge of said horizontal synchronization signal avoids coincidence with a rising edge of said clock signal.

2. A signal generator circuit according to claim 1; wherein the rising edge of said horizontal synchronization signal coincides with a falling edge of said clock signal.

3. A signal generator circuit according to claim 1; further comprising means for determining a time for starting said horizontal synchronization signal generating means and said clock signal generating means, said starting means being controlled by said time detecting means and said rising-edge detecting means.

4. A signal generator circuit according to claim 3; further comprising means for detecting the condition of said phase-locked loop circuit, the output of said condition detecting means being supplied to said starting means.

5. A signal generator circuit according to claim 4; further comprising an AND circuit responsive to said time detecting means and said condition detecting means and supplying an output to said starting means.

6. A signal generator circuit according to claim 3; wherein said clock signal generating means and said starting means respectively comprise flip-flop circuits supplied with said output signal of said voltage-controlled oscillator.

7. A signal generator circuit according to claim 6; wherein said output signal of said voltage-controlled oscillator is periodic and said clock signal generating means comprises a D - flip-flop having an input terminal and an inverted output terminal connected thereto and another input terminal supplied with said output signal of said voltage-controlled oscillator so that said clock signal generating means starts generating said clock signal during the period of said output signal of said voltage-controlled oscillator immediately following said starting time.

* * * * *